United States Patent [19]
Levenhagen

[11] 3,907,111
[45] Sept. 23, 1975

[54] SELF-CLEANING STACKABLE CONTAINER

[75] Inventor: Alvin W. Levenhagen, Linesville, Pa.

[73] Assignee: Rockwell International Corporation, Pittsburgh, Pa.

[22] Filed: June 14, 1973

[21] Appl. No.: 370,153

[52] U.S. Cl................................. 206/511; 206/72
[51] Int. Cl............................................ B65d 21/02
[58] Field of Search............... 220/66, 1 C, DIG. 6; 206/72, 503, 509, 510, 511, 512; D87/1 R; D9/177, 242, 246, 248

[56] References Cited
UNITED STATES PATENTS

| | | | |
|---|---|---|---|
| 2,822,106 | 2/1958 | Fabian | 206/511 |
| 3,283,943 | 11/1966 | Cargnelutti | 206/509 |
| 3,506,154 | 4/1970 | Barnes | 220/83 |
| 3,727,791 | 4/1973 | Fraser | 220/66 |

FOREIGN PATENTS OR APPLICATIONS
1,091,344  11/1967  United Kingdom................ 206/511

Primary Examiner—George E. Lowrance

[57] ABSTRACT

An open top integral container of the type used in the production of consumable products such as candy, capable of being stacked with another similar container and having self-cleaning features. The container has a substantially horizontally extending bottom interconnecting four substantially upright sides. A plurality of downwardly extending legs project from said sides. A plurality of upwardly and outwardly open recesses are formed in the outer walls of said sides for receiving the legs of a similar container in a stacked position. Each of said recesses is defined by a smoothly continuous surface consisting of substantially vertical portions smoothly merging with downwardly slanting portions.

9 Claims, 7 Drawing Figures

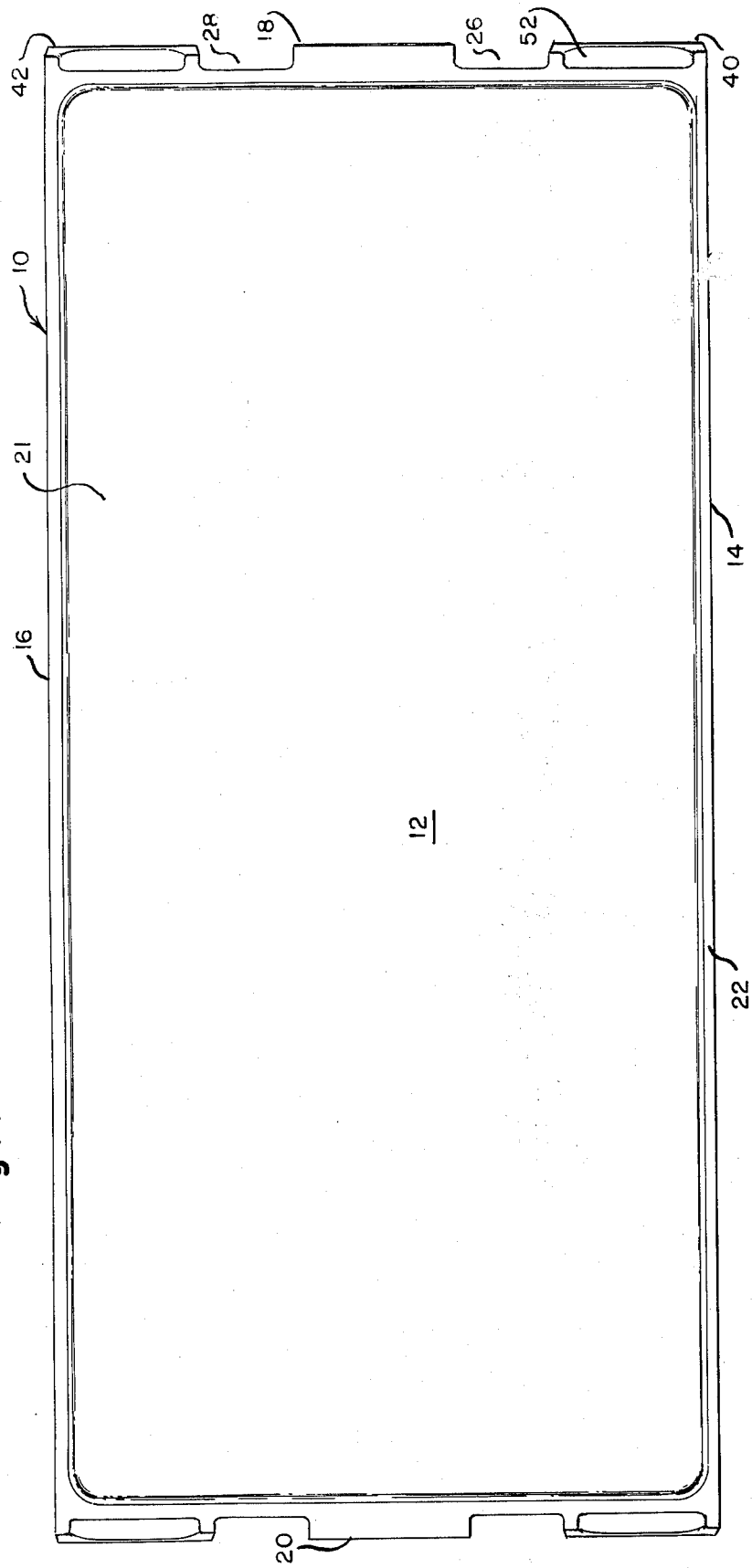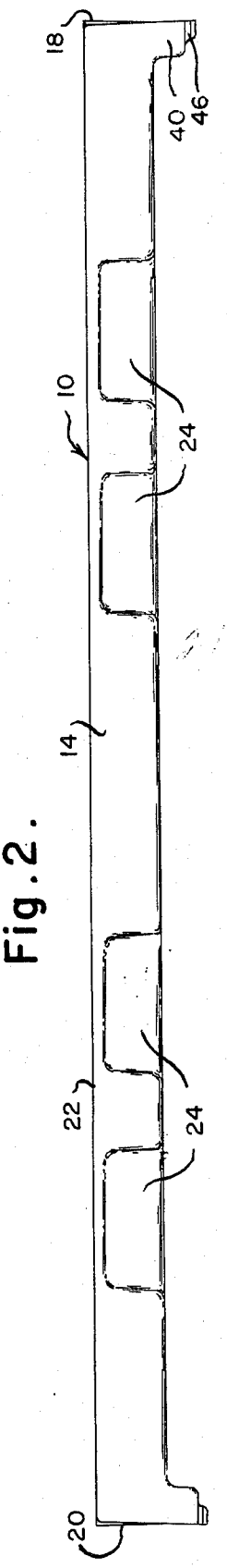

SELF-CLEANING STACKABLE CONTAINER

BACKGROUND OF THE INVENTION

The production of many types of candy includes the process of forming the desired product shape by pouring heated candy material in liquid form into a mold made of starch. Because of high volume production requirements and the relatively small size of the individual pieces of candy so produced, it is conventional for large, open top containers of shallow draft to be used as containers for starch in which a great number of mold cavities are formed by automated machinery. Such containers are known in the trade as "candy starch trays."

After the mold cavities formed in the starch are filled with liquid candy material, it is necessary for the candy starch trays to be stored for a period of time to allow the candy to cool into final form prior to the breaking up of the starch and the collection of the finished candy. Because of the relatively large surface areas of the candy starch trays and the necessity for the relatively unimpeded circulation of air about the trays during cooling, it is conventional in promoting efficient space utilization to provide large storage racks for the trays. These racks specially are constructed to permit vertical positioning of multiple stored trays on vertically superimposed rack shelves that are spaced apart a distance sufficient to allow adequate circulation of air about the trays. In high volume candy production operations, the cost of these racks and the time required to load and unload as well manipulate the racks into desired positions comprises a significant expense contributing toward the final cost of the finished candy.

Inasmuch as it is well known in the container art to provide self-stacking tote boxes and trays similar in general load carrying capacity to candy starch trays, various attempts have been made to design self-stacking containers that satisfactorily would function as candy starch trays. Such self-stacking containers would allow the elimination of candy starch tray storage racks and the expenses attendant thereto. However, because of requirements peculiar to the foodstuff industry in general and the candy starch production process in particular, self-stacking candy starch trays developed prior to the invention disclosed herein have not proven feasible and have not gained commercial acceptance.

In the production of consumables, cleanliness and general high sanitary standards are of utmost importance and this fact gives rise to certain mandatory requisites in the design of candy starch trays. The top surface of the sidewalls of such trays lie in the same plane since these containers are filled with starch by having a bulk volume of starch, in excess of the tray volume capacity, first deposited in the tray. A leveling blade then is passed across the top of the tray along the top surface of the sidewalls to level the starch even with the plane of the sidewall tops and to remove excess starch. This excess starch so removed simply falls over the sides of the candy starch tray. It has been determined that if any of this excess starch clings to the tray subsequent to this starch leveling operation, such an occurrence comprises an unacceptable departure from mandatory sanitary standards. It thus is necessary that candy starch trays be "self-cleaning" — a term used in the art to describe a tray design which does not allow the entrapment or attachment of removed excess starch.

Additionally, because of the necessity for adequate air circulation about stored candy starch trays, it is necessary that any satisfactory design for self-stacking trays provide for separation of the starch containing tray portions even when the trays are stacked. This requires that some type of feet or legs be included on the trays. However, once again for sanitary reasons, the tray portions that interface with an adjacent stacked tray cannot contact the starch in this adjacent tray.

It is therefore an object of this invention to provide an open top container suitable for use as a candy starch tray. A further object of this invention is to provide a candy starch tray that is self-stackable in vertical stacks wherein starch carrying portions of adjacent stacked trays are spaced apart to allow free circulation of air. A still further object of this invention is to provide a self-stacking candy starch tray that adheres to all sanitation requirements for trays so used.

SUMMARY OF THE INVENTION

An open top integral container constructed in accordance with this invention is of the type used in the production of consumable products such as candy and is capable of being vertically stacked with another suitable container as well as having self-cleaning features. The container has a substantially horizontal bottom interconnecting four substantially upright sides. A plurality of downwardly extending legs project from said sides. A plurality of upwardly and outwardly open recesses are formed in the outer walls of said sides for receiving the legs of a similar container in a stacked position. Each of the recesses is defined by a smoothly continuous surface consisting of substantially vertical portions smoothly merging with downwardly slanting portions.

DESCRIPTION OF THE DRAWINGS

FIG. 1 is a plan view of a self-cleaning, stackable container according to this invention;

FIG. 2 is a side elevation view of the container of FIG. 1;

DESCRIPTION OF THE INVENTION

Figure 3:
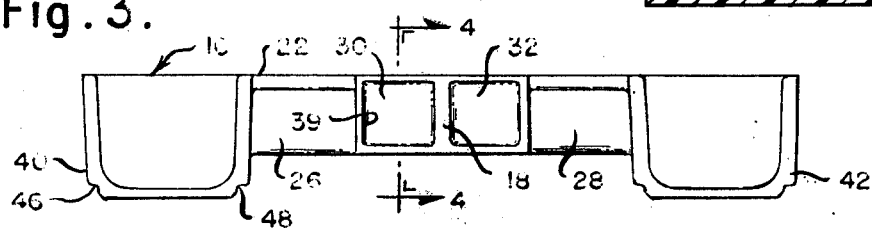
FIG. 3 is an end view of the container of FIGS. 1 and 2.

Referring now in detail to the drawings and in particular to FIGS. 1, 2 and 3, the numeral 10 denotes generally a container of a type suitable for use as a candy starch tray. Container 10 is an integral, one-piece unit that may be formed as by molding from fiberglass reinforced plastic material. The container has a generally horizontally extending bottom 12 that interconnects a pair of upright long sides 14 and 16 and a pair of upright short sides 18 and 20. The bottom and four sides define open top cavity 21. The top surfaces of all four sides 14, 16, 18 and 20 are equal in height and cooperate to form a planar surface 22.

Figure 5:
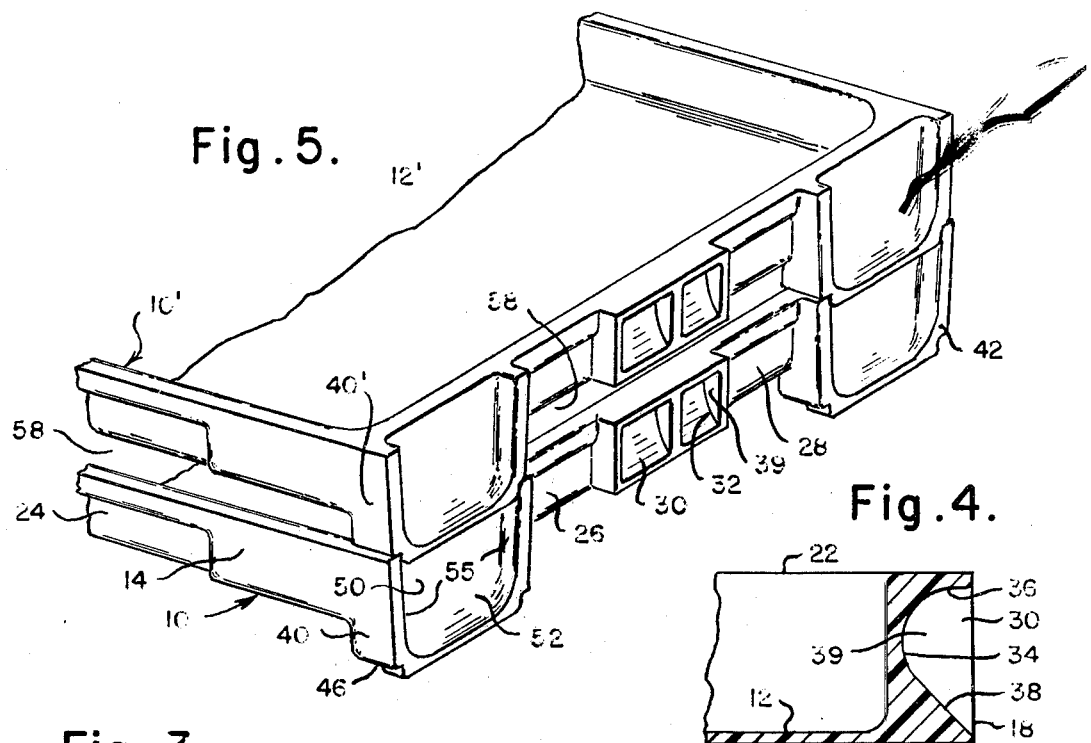
FIG. 5 is a partial isometric view of two containers identical to that shown in FIGS. 1–3 arranged in a vertical stacked position.

As best may be seen from FIGS. 2 and 5, long wall 14 has formed therein four outwardly and downwardly open recesses 24. As will be discussed in detail below relative to other recesses formed in the exterior surfaces of the walls of container 10, the surfaces defining recesses 24 are continuous and smooth in that they have no corners formed at the intersection of straight line or planar surfaces. Although wall 14 generally must be formed to a certain predetermined thickness for reasons of structural strength and must have a flat exterior surface to facilitate automated handling of the container 10, recesses 24 may be formed at selected portions of wall 14 to minimize material used in container 10 to reduce both costs of manufacture and weight of the container. Long wall 16 is formed with recesses (not shown) identical to recesses 24.

Short walls 18 and 20 are identical in construction so that only short wall 18 will be described in detail. Short wall 18 is formed with a pair of spaced apart recesses 26 and 28 in the exterior surface thereof intermediate its end portions. Recesses 26 and 28 are formed for the same reasons as the recesses 24 and also are defined by surfaces that are continuous, thus eliminating corners. It also should be noted that recesses 26 and 28 as well as the recesses 24, are defined by surfaces having portions that are downwardly facing and portions that are substantially vertical and outwardly facing. The significance of this arrangement will be discussed below.

Figure 4:
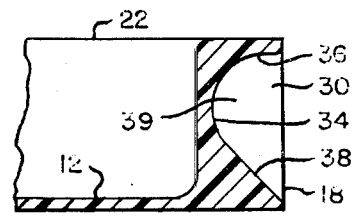
FIG. 4 is a partial section view taken along the line 4—4 of FIG. 3.

Near the midpoint of the length of wall 18 are formed a pair of spaced apart pockets 30 in the outer surface of this short wall. Pockets 30 and 32 are formed to provide hand holds for the manual manipulation of the tray 10 and cooperate with identical pockets formed in short wall 20 to accomplish this function. The pockets 30 and 32 substantially are square when viewed from the end of container 10 (FIG. 3), but as may be seen from FIG. 4 relative to pocket 30, they vary greatly in depth. As with the recesses in the outer wall surfaces described above, pocket 30 is defined in profile by a smooth continuous surface, surface 34, that has an arcurate portion 36 smoothly merging into an outwardly facing, downwardly slanted planar portion 38. Surface 34 also includes laterally facing vertical portions 39 that smoothly merge via curved surface areas with portions 36 and 38. It is important that the downwardly slanted planar portion 38 have a slant such that this portion make an angle with a horizontal plane of 45° or greater. It also should be noted that the configuration of pockets 30 and 32 is such that no corners are located within these pockets. The significance of the shape of pockets 30 and 32 will be elaborated upon below.

Figures 6, 7:
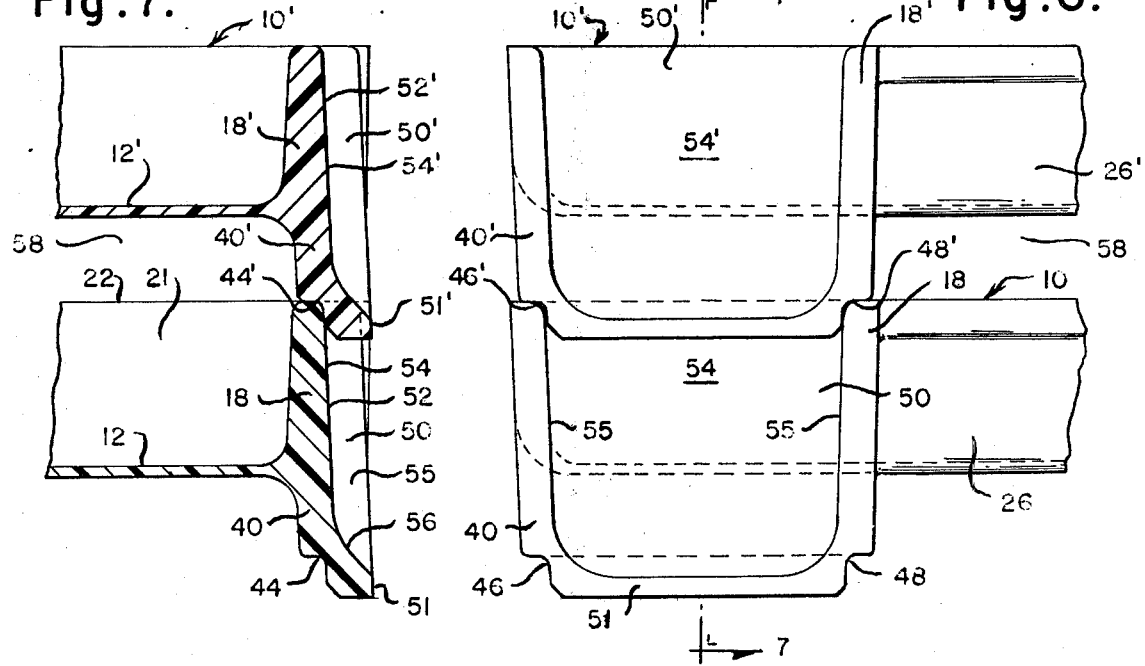
FIG. 6 is a partial end view of the two stacked containers of FIG. 5.
FIG. 7 is a partial section view taken along the line 7—7 of FIG. 6.

A pair of downwardly projecting legs or 40 and 42 extend from the bottom of wall 18 at the end portions thereof. A pair of identically formed feet also extend downwardly from wall 20. Only foot 40 will be described in detail herein since all four of these feet are the same. The inside bottom corner of foot 40 is notched at 44 along its entire length (FIGS. 6 and 7). A pair of grooves 46 and 48 are formed along the opposite bottom short edges of the foot 40 and thus intersect the notch 44.

At the same location along the length of wall 18 as feet 40 and 42, outwardly and upwardly open recesses are formed. At the location of foot 40, for example, recess 50 is formed in the outer surface of wall 18. The vertical dimension of recess 50 is such that the recess also extends into a portion of the outer surface 51 of foot 40. The surface 52 that defines the recess 50 is smoothly continuous, cornerless and comprises outwardly facing vertical portion 54 as well as a pair of laterally facing vertical portions 55 that smoothly blend with portions 54 by means of curved surface portions. Vertical portions 54 and 55 all smoothly blend with an outwardly facing slanted portion 56. As with the slanted surface portions of pocket 30, it is important that the slanted surface portions of recess 50 have a slant such that they make an angle with a horizontal plane of at least 45°.

Container 10 is self-stacking in that it may be vertically stacked with other similar containers. With reference to FIGS. 5, 6 and 7, it may be seen how container 10 is stacked under a similar container 10' the parts of which are identified by reference numerals that are the same, but primed, as the reference numerals identifying the parts of container 10. With container 10' placed upon container 10, the notch 44' in the bottom of leg 40' receives a length of the uppermost, outward extremity of wall 18 with the bottommost portion of leg 40' being received in recess 50. The other legs of container 10' are similarly oriented relative to corresponding portions of container 10 such that each recess 50 is substantially fully closed upwardly by the presence of container 10' stacked thereon. This interrelationship between the containers locks the containers against relative longitudinal movement. As best may be seen from FIG. 6, grooves 46' and 48' receive the uppermost parts of surface portions 55 thus positioning the containers against relative lateral movement.

The manner in which trays 10 and 10' are stacked is important because this stacking arrangement especially is designed to permit use of the container of this invention as a candy starch tray. As best may be seen from FIG. 7, despite the stacked tray arrangement, no portion of the upper tray 10' protrudes into the container cavity 21 wherein starch and candy products would be located. Thus the contents of cavity 21 are not exposed to any dirt or foreign matter that may accummulate on the feet of an adjacent stacked container. This is quite important for reasons of sanitation.

Also, because of the downward projection of the container feet, a space 58 is present between adjacent feet separating the containers. The vertical height of space 58 is dependent upon the vertical length of the feet and may be varied as required by varying the length of these feet. The space 58 provides for the circulation of air over the contents of the containers when these containers are used as candy starch trays and are in storage for the cooling and aging of candy that has been poured in heated liquid form into mold cavities in the starch located in cavity 21.

It is also important to note that, of necessity, the exterior surfaces of the container walls are formed with a great number of irregularities to accommodate formation of recesses 24, 26 and 28, pockets 30 and 32 and recesses 50. However, these exterior wall surfaces are formed with no sharp internal corners in that all surfaces lying in intersecting planes are joined by smooth, arcuate surface portions in place of internal corners. (The presence of external corners is acceptable.) Also, all of the recesses, pockets and irregularities formed in the external wall surface of the container are absent upwardly facing horizontal surfaces and all slanting surfaces slant outward downwardly and make an angle with a horizontal plane of at least 45°. These exterior container configurations provide that the container is self-cleaning.

When the container cavity 21 is loaded with bulk starch and leveled by having a straight edge passed along planar surface 22, the excess candy starch that is swept from the container by the straight edge over the sides of the container cannot become caught or lodged in any of the irregularities of the exterior of the container wall surfaces. There are no horizontal wall surfaces to catch this starch. There are no internal corners in which the starch may be lodged. All sloping surfaces slope outward in a downward direction at an angle of at least 45°. This self-cleaning feature is important for the container 10 to satisfy the sanitation requirements necessary for use as a candy starch tray.

It thus may be seen that this invention provides an open top container suitable for use as a candy starch tray. This container is self-stacking with other similar containers while allowing the free circulation of air between adjacent stacked containers. No portions of adjacent stacked containers intrude into the load carrying cavities of adjacent containers and the exterior wall portions of the container, although including many complex configurations, are self-cleaning to conform with necessary high standards of sanitation.

I claim:

1. An open top integral container capable of being stacked with another identical container, said container having a substantially horizontally extending bottom interconnecting four substantially upright sides, a plurality of downwardly extending legs projecting outwardly from said sides, each of said legs having a directly upwardly and outwardly open recess formed therein for receiving the leg of an identical container in a stacked position thereon, the surfaces defining each of said recesses being smoothly continuous and including no upwardly facing horizontal portions.

2. The container of claim 1, wherein each of said recesses is defined by a continuous surface consisting of substantially vertical portions smoothly merging with outwardly downwardly slanting portions.

3. The container of claim 2, wherein said outwardly downwardly slanting surface portions are such as to make an angle of 45° or greater with a horizontal plane.

4. The container of claim 1, further including a plurality of outwardly open, upwardly closed pockets formed in said sides, each of said pockets being defined by a continuous, cornerless surface having no upwardly facing horizontal portion.

5. An open top integral container having a substantially horizontally extending bottom interconnecting four substantially upright sides, a plurality of downwardly extending legs projecting from said sides, exterior walls of said legs being formed with a first group of recesses for receiving the legs of a similar container in a stacked position and a second group of recesses providing hand grips for the manual manipulation of said container, the surfaces defining all of said recesses being smoothly continuous and including no upwardly facing horizontal portions.

6. The container of claim 5 wherein said first group of recesses are upwardly and outwardly open and said second group of recesses are outwardly open and upwardly closed.

7. The container of claim 6, wherein said surfaces are cornerless and consist of flat portions and concavely arcuate portions smoothly merging with said flat portions.

8. The container of claim 5 including a third group of recesses formed in exterior walls of said sides to reduce the weight of said container, the surfaces defining said third group of recesses being smoothly continuous and including no upwardly facing horizontal portions.

9. The container in claim 1 wherein each of said recesses is disposed to be substantially fully upwardly closed by the presence of an identical container stacked thereon.

* * * * *